United States Patent Office 3,766,173
Patented Oct. 16, 1973

3,766,173
BASIC DITHIENYL COMPOUNDS
Kurt Thiele, Barcelona, Spain, and Klaus Posselt, Bergen-Enkheim, Germany, assignors to Deutsche Gold- und Silber-Scheideanstalt vormals Roessler, Frankfurt, Germany
No Drawing. Continuation-in-part of applications Ser. No. 834,149, June 17, 1969, and Ser. No. 29,656, Apr. 17, 1970, both now abandoned. This application Oct. 13, 1970, Ser. No. 80,456
Int. Cl. C07d 63/12
U.S. Cl. 260—240 R
18 Claims

ABSTRACT OF THE DISCLOSURE

Compounds are prepared having the formula

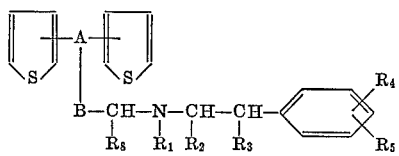

where both thienyl groups can be substituted by one or more lower alkyl groups, the bridge member >A—B— is either

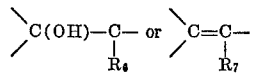

and $R_1$, $R_2$, $R_6$, $R_7$ and $R_8$ are hydrogen or lower alkyl, $R_3$ is hydrogen or hydroxyl and $R_4$ and $R_5$ are the same or different and are hydrogen, halogen, hydroxyl, lower alkyl, lower haloalkyl or lower alkoxy and their salts. The compounds can exist in optically active and diastereometric form. They are useful in heart and circulatory illnesses.

---

This application is a continuation-in-part of application Ser. No. 29,656, filed Apr. 17, 1970, and now abandoned, and application Ser. No. 834,149, filed June 17, 1969, and now abandoned.

The present invention is directed to new compounds of the formula

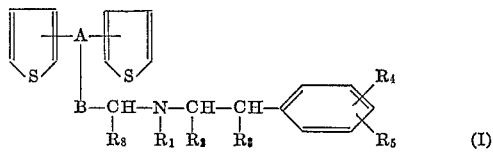 (I)

where the thienyl groups are either unsubstituted or substituted by one or more lower alkyl groups, the bridge member >A—B— is either

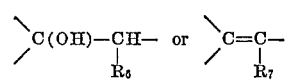

and $R_1$, $R_2$, $R_6$, $R_7$ and $R_8$ are the same or different and are hydrogen or lower alkyl, $R_3$ is hydrogen or hydroxyl and $R_4$ and $R_5$ are the same or different and are hydrogen, halogen, hydroxyl, lower alkyl, lower haloalkyl or lower alkoxy and their salts, especially their pharmacologically acceptable salts. The compounds also exist in optically active diastereometric forms. The alkyl, haloalkyl and alkoxy groups have 1 to 6 carbon atoms. An example of a haloalkyl group is trifluormethyl.

The compounds of the invention are pharmacologically active, especially in heart and circulatory illnesses. They cause a widening of the coronary vessels and increase the peripheral and cerebral blood flow. This effect is accompanied in a number of cases by a positive inotropic effect. They are useful in human and veterinary medicine, e.g. in treating dogs and cats, and in agriculture.

The compounds of the invention, particularly in the form of their salts, also can be used to cure melamine-formaldehyde resins.

The production of the compounds of the invention can be carried out, for example, if there is reacted in known manner a compound of the formula

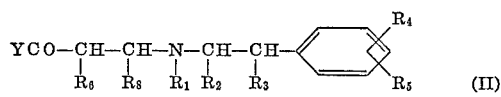 (II)

where Y is chlorine, bromine or an alkoxy group or a thienyl group with a thienyl metal compound and/or compounds of Formula I where >A—B— is

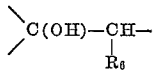

are converted to the corresponding unsaturated compound

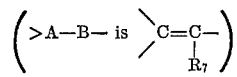

and in a given case the basic compounds obtained are converted by known methods to the salts.

The process for the reaction of a ketone of Formula II with a thienyl metal compound is suitably carried out at a temperature between —700° C. and +100° C. While in the preparation of many of the compounds a lower limit of —40° C. is sufficient when the reaction involves a thienyl-(3)-metal compound the reaction goes most favorably below —40° C., for example, —70° C. As the solvent, for example, there can be employed dialkyl ethers, e.g. diethyl ether, tetrahydrofurane, hydrocarbons, benzene, etc. When Y in the Formula II is a thienyl group, only one mole of thienyl metal compound is necessary for the reaction while 2 moles of thienyl metal compound are necessary if Y is chlorine, bromine or an alkoxy group. As thienyl metal compounds thienyl lithium and thienyl Grignard compounds, e.g. thienyl magnesium chloride and thienyl magnesium bromide are of primary importance.

However, a corresponding excess of metallo organic compound is always necessary when the added compound II contains active hydrogen (amino and hydroxyl groups, salt).

It is generally recommended in many cases to use an excess of metallo organic compound since in this way better yields are obtained.

The splitting out of water from compounds wherein >A—B is

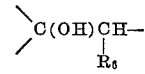

is carried out suitably at elevated temperatures, for example, in the temperature range of 20–150° C. Preferably, solvents are used such as, for example, glacial acetic acid, benzene, dioxane, etc.

As agents for splitting out water there can be used, for example, mineral acids such as sulfuric acid or hydrohalic acids, e.g. hydrochloric acid and hydrobromic acid; organic acids such as oxalic acid, formic acid, p-toluene sulfonic acid, thionyl chloride; aluminum chloride, zinc chloride, stannic chloride, boron trifluoride, potassium hydrogen sulfate, aluminum oxide, phosphorus pentoxide, acid chlorides, e.g. acetyl chloride; red phosphorus+iodine in the presence of water.

Those compounds which contain asymmetric carbon atoms and as a rule precipitate as racemates can in known way, for example, by means of optically active acids, be split into the optically active isomers. However, it is also possible from the outset to use optically active or diastereomer starting material whereby there is obtained in the final product a corresponding pure optically active form or diastereomer configuration.

The transfer into the salts can be accomplished by known methods. As anions for the salts there can be used the known therapeutically and pharmacologically acceptable acid residues. Thus there can be used salts of hydrochloric acid, maleic acid, malonic acid, acetic acid, lactic acid, etc.

The compounds of the invention are suited for the production of pharmaceutical compositions and preparations. The pharmaceutical compositions or medicines contain one or more of the compounds of the invention as active ingredients, in a given case in admixture with other pharmacologically active materials. The production of the medicines can be accomplished with the use of known and customary pharmaceutical carriers and additives. The medicines can be employed enterally, parenterally, orally, perlingually or in the form of sprays.

Dispensing can be in the form of tablets, capsules, pills, dragées, plugs, liquids or aerosols. As liquids, for example, there can be used oils or aqueous solutions or suspensions, emulsions injectable aqueous or oily solutions or suspensions.

The compounds can be applied at dosages of 0.05 to 5 mg. per kilogram of body weight.

The starting compounds of Formula II in which Y is a thienyl residue, e.g. l-$\beta$-[1-phenyl-1-hydroxypropyl - (2)-amino]-propiothienone-(2)·HCl were prepared according to application Ser. No. 693,138, filed Dec. 26, 1967.

The compounds according to the invention were tested on dogs (whole animal) for their activity on cerebral and peripheral blood flow. Also the compounds were tested on isolated guinea pig heart following the method of Langendorff (Pfluger's Arch., 61, 291, 1895) for their activity on coronary blood flow, contraction amplitude and heart frequency.

Their toxicity ($LD_{50}$ mg./kg.) was tested on mice upon oral application by the method of Miller and Tainter (Proc. Soc. Exper. Biol. a, Med., 57, 261, 1944).

The compounds of the invention caused an increase in the cerebral and peripheral blood flow in dogs at a dosage of 0.05 to 5 mg./kg.

Furthermore, the compounds caused an increase in coronary blood flow in a dosage range of 5 to 500 µg./heart in the isolated Langendorff heart. Several compounds also produced increased contraction amplitude.

The compounds are useful to increase the brain and muscle blood flow as well as to improve the blood flow of the heart.

The pharmacological administration of the compounds is by the usual standard methods for administration of compounds which are active in improving heart and circulatory flow. The application can be done, for example, enterally, parenterally, orally, perlingually or in the form of sprays. Delivery can be carried out in the form of tablets, capsules, pills, coated pills (dragées), suppositories, liquid consonant or aerosols. As liquid consonants, there can be employed oily or aqueous solutions or suspensions, emulsions, injectable aqueous or oily solutions or suspensions.

The individual dosage rate for human beings is between 1 and 100 mg. of active compound one or more times a day.

Unless otherwise indicated, all parts and percentages are by weight.

The increase in the cerebral and peripheral blood flow was ascertained by measurement of the cerebral and peripheral blood flow of narcotized dogs after intravenous application. For this purpose the blood flow was measured with an electromagnetic flow meter (apparatus made by Statam) in the *Arteria vertebralis* (brain) and *Arteria femoralis* (periphery).

The results are given in the following table:

| Compound of Example | Dosage, mg./kg. of body weight | Blood flow brain, $\overline{D}_G$ | Blood flow periphery, $\overline{D}_P$ | Toxicity, $LD_{50}$ mouse orally, mg./kg. |
|---|---|---|---|---|
| 6  | 0.3 | +143.8 | +90.9 | 412 |
| 14 | 0.3 | +144.3 | +46.7 | 1,200 |
| 15 | 0.3 | +84.9  | +56.2 | 2,000 |
| 16 | 0.3 | +190.2 | +39.1 | 1,270 |
| 17 | 1.0 | +153.3 | +47.0 | 2,575 |

The $\overline{D}_G$ and $\overline{D}_P$ values are regarded as a determining factor for the average increase in the cerebral and peripheral blood flow during one hour when compared with the values at the beginning of the test. They were determined by graphical exploiting the plane integral of the curve of activity during one hour period of observation (activity-time-integral). The values found out as mean values of 3 to 6 single tests.

EXAMPLE 1 d,l-[1,1dithienyl-(2)-1-hydroxypropyl-(3)]-[1-phenyl-propyl-(2)]-amine

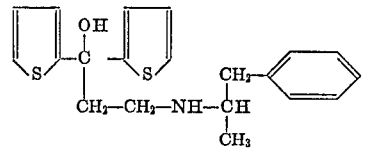

The Grignard compound was prepared from 4.8 grams (0.2 mole) of magnesium and 32.6 grams (0.2 mole) of 2-bromothiophene in 50 ml. of absolute ether. To this solution there was added a suspension of 30.9 grams (0.1 mole) of d,l - $\beta$ - [1-phenylpropyl-(2)-amino]-propiothienone-(2)·HCl in 250 ml. of absolute ether and the mixture held at the boiling point for 2 hours. Then it was decomposed with 250 ml. of a 25% aqueous ammonium chloride solution, the base extracted with ether, the ether solution dried with potassium carbonate, the solvent distilled off and the base purified by distillation. B.P. 288–230° C. at 0.1 torr.

The maleate was produced from the base by adding 7.5 grams of maleic acid to 23 grams of the base in 250 ml. of ether and recrystallizing from isopropanol. Yield 24 grams, M.P. 134° C.

EXAMPLE 2 l-[1,1-dithienyl-(2)-1-hydroxypropyl-(3)]-[1-phenyl-1-hydroxypropyl-(2)]-amine

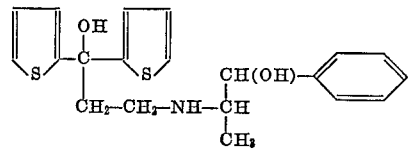

The Grignard compound was prepared from 60.5 grams (2.5 moles) of magnesium and 408 grams (2.5 moles) of 2-bromothiophene in 500 ml. of absolute ether. To this solution there was added a suspension of 163 grams (0.5 mole) of l-$\beta$-[1-phenyl-1-hydroxy-propyl-(2)-amino]-propiothienone-(2)·HCl in one liter of absolute benzene and the mixture heated for 3 hours at reflux.

After decomposition with 1000 ml. of 25% aqueous ammonium chloride, the organic phase was separated off, dried with potassium carbonate and the solvent removed by distillation. The residual base was dissolved in ether and converted to the maleate in the manner described in Example 1. The salt was extracted with ethyl acetate and subsequently with water recrystallized from benzene-acetone (1:1 by volume). Yield 67 grams, M.P. 137–138° C.

EXAMPLE 3

1-[1-thienyl-(2)-1-(thienyl-(3)-1-hydroxypropyl-(3)]-
[1-phenyl-1-hydroxy-propyl-(2)]-amine

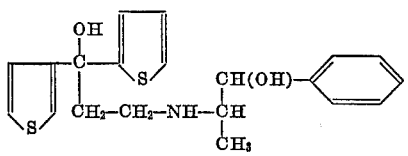

The Grignard compound was prepared from 12.1 grams (0.5 mole) of magnesium and 81.5 grams (0.5 mole) of 2-bromothiophene in 150 ml. of absolute ether and reacted with 32.5 grams (0.1 mole) of 1-β-[1-phenyl-1-hydroxypropyl-(2)-amino] - propiothienone - (3)·HCl in 200 ml. of absolute benzene and worked up as in Example 2. However, the base was precipitated from the ether solution as the hydrochloride with isopropanolic HCl and recrystallized from water and subsequently from 10% aqueous ethanol. Yield 12 grams, M.P. 199–200° C.

EXAMPLE 4 d,l-[1,1-dithienyl-(2)-propen-(1)-yl-(3)]-
[1-phenylpropyl-(2)]-amine

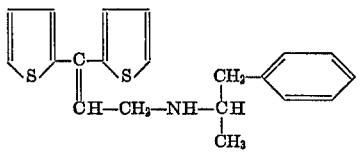

Hydrogen chloride was introduced into a suspension of 13 grams (0.0275 mole) of d,l-[1,1-dithienyl-(2)-1-hydroxypropyl-(3)]-[1-phenylpropyl-(2)]-amine maleate in 100 ml. of glacial acetic acid until complete solution occurred. The solvent was distilled off and the residue treated with 25% ammonia and the base taken up in ether. From the ether solution the hydrochloride was precipitated with isopropanolic HCl and recrystallized from glacial acetic acid. Yield 5 grams, M.P. 127–128° C.

EXAMPLE 5

1-[1,1-dithienyl-(2)-propen-(1)-yl-(3)]-[1-phenyl-1-hydroxypropyl-(2)]-amine

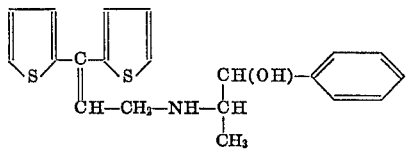

24 grams (0.0586 mole) of 1-[1,1 - dithienyl - (2) - 1-hydroxypropyl-(3)]-[1-phenyl - 1 - hydroxypropyl-(2)]-amine maletate in 100 ml. of glacial acetic acid were treated with hydrogen chloride and worked up as in Example 4. The HCl salt was purified by recrystallization from isopropanol and 20% ethanol. Yield 4 grams, M.P. 189–190° C.

EXAMPLE 6

1-[1-thienyl-(2)-1-thienyl-(3)-propen-(1)-yl-(3)]-
[1-phenyl-1-hydroxypropyl-(2)]-amine

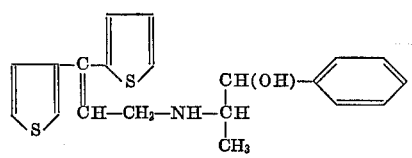

12.3 grams (0.03 mole) of 1-[1-thienyl - (2) - 1-thienyl-(3)-1-hydroxypropyl - (3)] - [1 - phenyl - 1 - hydroxypropyl-(2)]-amine hydrochloride in 100 ml. of glacial acetic acid were treated with HCl gas whereby the substance first went into solution. After some time, the HCl salt of the unsaturated compound precipitated out and was recrystallized from 20% ethanol, Yield 6 grams, M.P. 206–207° C.

EXAMPLE 7

1-[1,1-dithienyl-(2)-1-hydroxypropyl-(3)]-[1-phenyl-1-hydroxypropyl-(2)]-amine

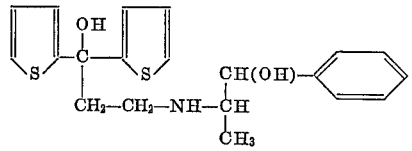

The Grignard compound was prepared from 7.2 grams (0.3 mole) of magnesium and 49 grams (0.3 mole) of 2-bromothiophene in 100 ml. of absolute ether. To this solution there was added 12.5 grams (0.05 mole) of 1-β-[1-phenyl - 1 - hydroxypropyl - (2) - amino]-propionic acid ethyl ester (M.P. 76–77° C., produced by reaction of l-norephedrine with ethyl acrylate in ethanol) in 200 ml. of absolute benzene and the mixture heated at reflux for 3 hours. After decomposition with 10% aqueous ammonium chloride solution, the organic phase was separated, dried with potassium carbonate and the solvent distilled off. The base remaining behind was dissolved in ether and converted to the maleate by addition of maleic acid. This was extracted with ethyl acetate and subsequently with water and recrystallized from benzene-acetone (1:1 by volume). Yield 5 grams, M.P. 137–138° C.

EXAMPLE 8

1-[1-thienyl-(2)-1-thienyl-(3)-propen-(1)-yl-(3)]-
[1-phenyl-1-hydroxypropyl-(2)]-methylamine

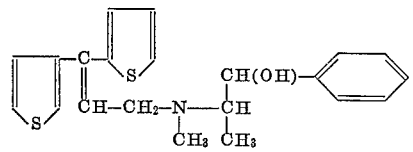

The Grignard compound was prepared from 7.2 grams (0.3 mole) of magnesium and 49 grams (0.3 mole) of 2-bromothiophene in 100 ml. of absolute ether. To this solution there was added 17 grams (0.05 mole) of 1-β-[1 - phenyl - 1 - hydroxypropyl - (2) - methylamino]-propiothienone - (3)·HCl (M.P. 145° C. with sintering produced by heating 3-acetylthiophene, paraformaldehyde and 1-ephedrine·HCl in isopropanol) suspended in 100 ml. of absolute benzene and the mixture heated for 3 hours under reflux. After decomposition with ice and 50 grams of ammonium chloride, the organic phase was separated, dried with potassium carbonate and the solvent distilled ofl. The base remaining behind was dissolved in ether and acidified with isopropanolic·HCl. The sirupy precipitating HCl salt was dissolved in 50 ml. of glacial acetic acid, treated with HCl gas for 15 minutes and the solvent distilled off. The residue was treated with 25% ammonia, the base dissolved in ether and neutralized with isopropanolic HCl. The HCl salt was recrystallized from isopropanol. Yield 3 grams, M.P. 202–203° C.

EXAMPLE 9

1-{1-thienyl-(3)-1-[2-methylthienyl-(5)]-1-hydroxypropyl-(3)}-[1-phenyl-1-hydroxypropyl-(2)]-amine

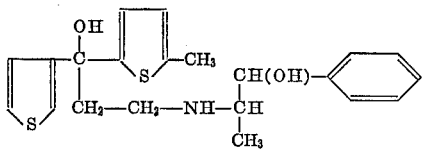

The Grignard compound was prepared from 12.2 grams (0.5 mole) of magnesium and 88.5 grams (0.5 mole) of 2-bromo-5-methylthiophene in 200 ml. of absolute ether. To this solution there was added a suspension of 32.5 grams (0.1 mole) of β-[1-phenyl-1-hydroxy-propyl-(2)-amino]-propiothienone-(3)·HCl (M.P. 195–196° C., produced by heating 3-acetylthiophene, paraformaldehyde and l-norephedrin·HCl in isopropanol) in 200 ml. of absolute benzene and the mixture heated for 3 hours at reflux. After decomposition with ice and 70 grams of ammonium chloride, the organic phase was separated, dried with potassium carbonate and the solvent distilled off. The base was dissolved in ether and neutralized with isopropanolic HCl. The precipitating HCl salt was recrystallized from water-ethanol (9:1 by volume). Yield 9 grams, M.P. 193–195° C.

EXAMPLE 10 d,l-[1-thienyl-(2)-1-thienyl-(3)-1-hydroxypropyl-(3)]-[2-(4-t-butylphenyl)-2-hydroxy-ethyl]-amine

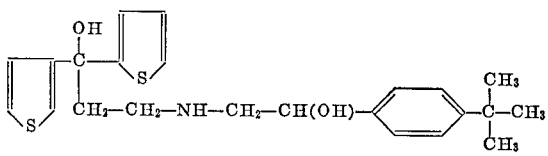

The Grignard compound was prepared from 12.2 grams (0.5 mole) of magnesium and 81.5 grams (0.5 mole) of 2-bromothiophene in 200 ml. of absolute ether. To this solution there was added a suspension of 33.1 grams (0.1 mole) of d,l-β-[2-(4-t-butylphenyl)-2-hydroxyethylamino]-propiothienone-(3) (M.P. 133° C., produced by reaction of β-dimethylamino propiothienone-(3) and 2-(4-t-butylphenyl)-2-hydroxyethylamine in water-alcohol) suspended in 200 ml. of absolute benzene and heated for 3 hours at reflux. After decomposition with ice and 70 grams of ammonium chloride, the organic phase was separated off, dried with potassium carbonate and the solvent distilled off. The base remaining behind was treated with ether and recrystallized from benzene. Yield 11 grams, M.P. 158° C.

EXAMPLE 11 l-[1-thienyl-(2)-1-thienyl-(3)-2-methylpropen-(1)-yl-(3)]-[1-phenyl-1-hydroxypropyl-(2)]-amine

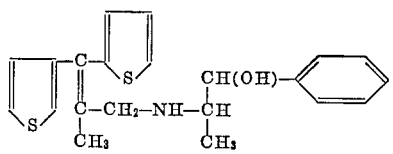

The Grignard compound was prepared from 12.2 grams (0.5 mole) of magnesium and 81.5 grams (0.5 mole) of 2-bromothiophene in 100 ml. of absolute ether. To this solution there was added a suspension of 33.9 grams (0.1 mole) of l-α-methyl-β-[1-phenyl-1-hydroxypropyl-(2)-amino]-propiothienone-(3)·HCl (M.P. 188–190°, produced by heating 3-propionylthiophene, paraformaldehyde and l-norephedrin·HCl in isopropanol) in 200 ml. of absolute benzene. After decomposition with ice and 70 grams of ammonium chloride, the organic phase was separated, dried with potassium carbonate and the solvent distilled off. The base was dissolved in ether and converted to the HCl salt with isopropanolic HCl. The syrupy precipitating salt was crystallized from acetone and recrystallized from isopropanol. Yield 8 grams, M.P. 200–201° C.

EXAMPLE 12 d,l-[1-thienyl-(2)-thienyl-(3)-1-hydroxypropyl-(3)]-[1-phenyl-1-hydroxypropyl-(2)]-amine

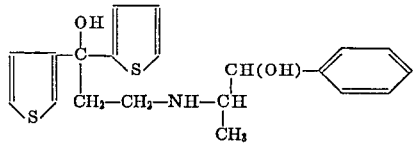

The Grignard compound was prepared from 6.8 grams (0.28 mole) of magnesium and 45.6 grams (0.28 mole) of 2-bromothiophene in 100 ml. of absolute ether. There was added to this solution a suspension of 22.8 grams (0.07 mole) of d,l-β-[1-phenyl - 1 - hydroxypropyl-(2)-amino]-propiothenone-(3)·HCl in 200 ml. of absolute benzene and the mixture heated under reflux for 3 hours. (The starting ketone was prepared by heating 3-acetylthiophene with paraformaldehyde and d,l-norephedrine. HCl in isopropanol, M.P.187–188° C.). After decomposition with ice and 50 grams of ammonium chloride the organic phase was separated, dried with potassium carbonate and the solvents distilled off. The base remaining behind was dissolved in acetone and neutralized with isopropanolic HCl. The HCl salt was recrystallized from ethanol. Yield 7 grams, M.P. 177–178° C.

EXAMPLE 13 d,l-[1-thienyl-(2)-1-thienyl-(3)-propen-(1)-yl-(3)]-[1-phenyl-1-hydroxypropyl-(2)]-amine

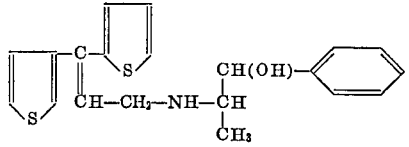

4 grams (0.01 mole) of d,l-[1-thienyl-(2)-1-thienyl-(3)-1-hydroxypropyl-(3)]-[1 - phenyl - 1 - hydroxypropyl-(2)]amine·HCl were treated in 50 ml. of chloroform with HCl gas whereby the material went into solution. The solvent was distilled off, the residue treated with 25% ammonia and the base taken up in ether. The hydrochloride was precipitated from the ether solution with isopropanolic HCl and recrystallized from water. Yield 2 grams M.P. 192–194° C.

It has been found that compounds within the invention having the formula

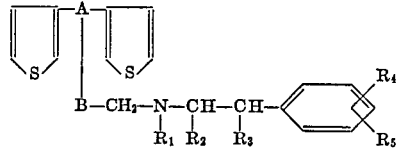

have particularly valuable pharmaceutical properties of the type set forth previously, e.g. increase in cerebral and peripheral blood flow and increase in coronary blood flow. The compounds of Examples 16 and 17 below possess the most outstanding pharmacological properties of the compounds tested.

EXAMPLE 14

1-[1,1-dithienyl-(3)-1-hydroxypropyl-(3)]-[1-phenyl-1-hydroxypropyl-(2)]-amine

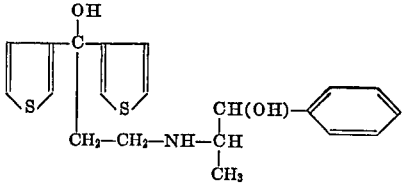

(a) The compound was prepared in the following manner. The 3-thienyl lithium solution was prepared from 21 grams (0.33 mole) of n-butyl lithium dissolved in 200 ml.

of n-hexane and 48.9 grams (0.3 mole) of 3-bromothiophene at —70° C. To this solution at —70° C. there were added 28.9 grams (0.1 mole) of 1-β-[1-phenyl-1-hydroxypropyl-(2)-amino]-propiothienone-(3) in 200 ml. of absolute ether and the mixture held at —70° C. for 30 minutes. (The starting ketone was produced by heating 3 acetylthiophene with paraformaldehyde and β-norephedrine·HCl in isopropanol and setting the base free with NaOH, M.P. 125° C.) After gradual warming to —10° C. the product was decomposed with 100 ml. of water, the organic phase separated, dried with potassium carbonate and the solvent distilled off. The base remaining behind was dissolved in ether and neutralized with isopropanolic HCl. The HCl salt was recrystallized from isopropanol. Yield 8.5 grams, M.P. 214° C.

(b) The same compound was prepared as follows: The 3-thienyl lithium solution was prepared from 16 grams (0.25 mole) of n-butyl lithium in 167 ml. of n-hexane and 40.7 grams (0.25 mole) of 3-bromothiophene at —70° C. To this solution was added 25 grams (0.1 mole) of l-β-[1-phenyl - 1 - hydroxypropyl-(2)-amino]-ethyl propionate in 100 ml. of absolute ether and the mixture held at —70° C. for 30 minutes. (The starting ester was obtained by reaction of l-norephedrine with ethyl acrylate in ethanol, M.P. 76–77° C.) After gradual warming to —10° C., the product was decomposed with 100 ml. of water, the organic phase separated, dried with potassium carbonate, filtered and neutralized with isopropanolic HCl. The HCl salt was recrystallized from isopropanol. 10 grams, M.P. 214°C.

EXAMPLE 15 d,l-[1,1-diethienyl-(3)-1-hydroxypropyl-(3)]-[1-phenyl-1-hydroxypropyl-(2)-]amine

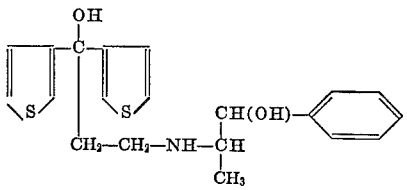

The 3-thienyl lithium solution was prepared from 21 grams (0.33 mole) of n-butyl lithium in 200 ml. of n-hexane and 48.9 grams (0.3 mole) of 3-bromothiophene at —70° C. There were dropped into this solution at —70° C. 28.9 grams (0.1 mole) of d,l-β-[1-phenyl-1-hydroxypropyl-(2)-amino]-propiothienone-(3) in 200 ml. of absolute ether. (The starting ketone was obtained by heating 3-acetyl thiophene with paraformaldehyde and d,l-norephedrine·HCl in isopropanol and setting the base free with NaOH, M.P. 133° C.) After gradual warming at —10° C. the product was decomposed with water, the organic phase separated, dried with potassium carbonate and the solvent distilled off. The base remaining behind was crystallized with ether and recrystallized from ether. Yield 19 grams, M.P. 151° C. The HCl salt melted at 205° C.

EXAMPLE 16

1-[1,1-dithienyl-(3)-propen-(1)-yl-(3)]-[1-phenyl-1-hydroxypropyl-(2)]-amine

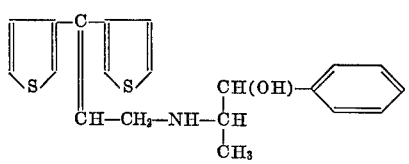

18 grams (0.044 mole) of 1-[1,1-dithienyl-(3)-1-hydroxypropyl-(3)]-[1-phenyl-1-hydroxypropyl-(2)]-amine in 100 ml. of chloroform were treated with HCl gas until the entire material went into solution. The solvent was distilled off, the residue treated with 10% soda lye, the base taken up in ether and neutralized with isopropanolic HCl. The HCl salt was recrystallized from ethanol. Yield 8 grams, M.P. 225° C.

EXAMPLE 17 d,l-[1,1-dithienyl-(3)-propen-(1)-yl-(3)]-[1-phenyl-1-hydroxypropyl-(2)]-amine

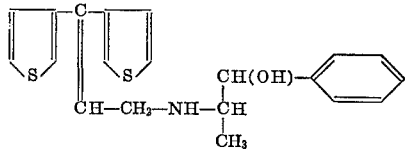

50 grams (0.13 mole) of d,l-[1,1-dithienyl-(3)-1-hydroxypropyl-(3)]-[1-phenyl-1-hydroxypropyl-(2)]-amine in 500 ml. of chloroform were treated with HCl gas until the entire material went into solution. The solvent was distilled off, the residue treated with 10% soda lye, the base taken up in ether and neutralized with isopropanolic HCl. The HCl salt was recrystallized from alcohol. Yield 31 grams, M.P. 215° C.

EXAMPLE 18

1-[1,1-dithienyl-(3)-2-methylpropen-(1)-yl-(3)]-[1-phenyl-1-hydroxypropyl-(2)]-amine

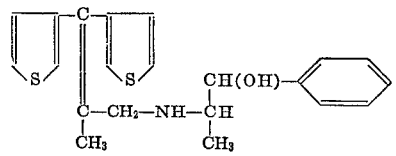

The 3-thienyl lithium solution was prepared from 32 grams (0.5 mole) of n-butyl lithium in 333 ml. of n-hexane and 81.5 grams (0.5 mole) of 3-bromothiophene at —70° C. There were dropped into this solution 42 grams (0.165 mole) of l-β-[1-phenyl - 1 - hydroxypropyl-(2)-amino]-2-methyl-propionic acid methyl ester in 200 ml. of absolute ether at —70° C. (The starting ester was obtained by reaction of l-norephedrine with methyl methacrylate and purification over a silica gel column.) After gradually warming to —10° C. the product was decomposed with 200 ml. of water, the organic phase separated, dried with potassium carbonate and the solvent distilled off. The residue was dissolved in chloroform and treated with HCl gas for 30 minutes. The solvent was distilled off, the residue treated with 10% soda lye, the base taken up in ether and neutralized with isopropanoic HCl. The HCl salt was recrystallized from isopropanol. Yield 7 grams, M.P. 199° C.

In addition to the compounds mentioned in the specific examples, illustrative of other compounds within the invention that can be prepared in similar fashion are d,l-[1,1-di-(3-butylthienyl-(2)-hydroxypropyl-(3)]-[1-phenylpropyl-(2)]-amine;
d,l-[1,1-di-2-isopropylthienyl)-(5)-propen-(1)-yl]-[1-phenylpropyl-(2)]-amine;
d,l-[1,1-dithienyl-(2)-1-hydroxy-2-methylpropyl-(3)]-[1-2-methylphenylpropyl-(2)]-amine;
d,l-[1,1-dithienyl-(2)-1-hydroxy-2-ethylpropyl-(3)]-[1-4-trifluoromethylphenylpropyl-(2)]-amine;
d,l-[1,1-dithienyl-(2)-1-hydroxy-3-methylpropyl-(3)]-[1-4-chlorophenyl-1-hydroxypropyl-(2)]-amine;
d,l-[1,1-dithienyl-(2)-propen-(1)-yl-(3)]-[1-2,4-dimethylphenylpropyl-(2)]-amine;
d,l-[1,1-dithienyl-(2)-1-hydroxypropyl-(3)]-[1-2-ethyl-4-hydroxyphenylpropyl-(2)]-amine;
d,l-[1,1-dithienyl-(2)-propen-(1)-yl-(3)]-[1-2,4-dihydroxyphenylpropyl-(2)]amine;
1-[1,1-dithienyl-(2)-1-hydroxypropyl-(3)]-[1,2-chloro-4-bromophenylpropyl-(2)]-amine;
1-[1,1-dithienyl-(2)-1-hydroxypropyl-(3)]-[1-4-methoxy-phenyl-1-hydroxypropyl-(2)]-amine;
d,l-[1,1-dithienyl-(2)-propen-1-yl-(3)]-[1-2,4-dibutoxyphenylpropyl-(2)]-amine;

1-{1-thienyl-(3)-1-[2-ethylthienyl-(5)]-1-hydroxy-
propyl-3}-[1,4-fluorophenyl-1-hydroxyproyl-(2)]-
amine;
d,l-[di-(2-butylthienyl-(3)-1-hydroxypropyl-(3)]-
[1-phenyl-1-hydroxypropyl-(2)]-amine;
d,l-[1,1-di(2-methylthienyl-(3)-1-hydroxypropyl-(3)]-
[1-phenyl-1-hydroxypropyl-(2)]-amine;
d,l-[1,1-di(2-butylthienyl-(3)-propen-(1)-yl-(3)]-
[1-phenyl-1-hydroxypropyl-(2)]-amine;
1-[1,1-di-(2-methylthienyl-(3)-propen(1)-yl-(3)]-
[1-phenyl-1-hydroxypropyl-(2)]-amine;
d,l-[1,1-dithienyl-(3)-1-hydroxypropyl-(3)]-[1-4-tri-
fluoromethylphenyl-1-hydroxypropyl-(2)]-amine;
d,l-[1,1-dithienyl-(3)-1-hydroxypropyl-(3)]-[1-phenyl-
propyl-(2)]-amine;
1-[1,1-di-thienyl-(3)-propen-(1)-yl-(3)]-[1-4-trifluoro-
methylphenyl-1-hydroxypropyl)-(2)]-amine;
1-[1,1-dithienyl-(3)-1-hydroxypropyl-(3)]-[1-3-chloro-
phenyl-1-hydroxypropyl-(2)]-amine;
d,l[1-1-dithienyl-(3)-propen-(1)-yl-(3)]-[1-4-bromo-
phenyl-1-hydroxypropyl-(2)]amine;
d,l-[1,1-dithienyl-(3)-1-hydroxypropyl-(3)]-[1-4-
methylphenyl-1-hydroxypropyl-(2)]-amine;
d,l-[1,1-dithienyl-(3)-1-hydroxypropyl-(3)]-[1-2-hy-
droxyphenylpropyl-(2)]-amine;
d,l-1,1-dithienyl-(3)-propen-(1)-yl-(3)-[1-2-propyl-
4-hydroxyphenyl-1-hydroxypropyl-(2)]-amine;
1-[1,1-dithienyl-(3)-propen-(1)-yl-(3)]-[1-2,4-dihy-
droxyphenyl-1-hydroxypropyl-(2)]-amine;
d,l-[1,1-dithienyl-(3)-propen-(1)-yl-(3)]-[1-2-hy-
droxy-4-methoxyphenyl-1-hydroxypropyl-(2)]-amine.

What is claimed is:
1. A compound selected from the group consisting of compounds having the formula

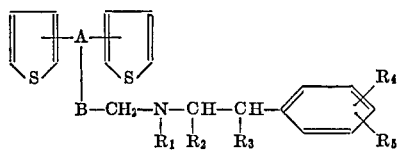

wherein the thienyl rings are unsubstituted or have one lower alkyl group attached thereto, bridge member A—B— is C(OH)—CH₂— or —C=R₇; R₁ and R₂ are hydrogen or lower alkyl, R₃ is hydroxyl, R₄ and R₅ are hydrogen, halogen, hydroxy, lower alkyl, halo lower alkyl or lower alkoxy, R₇ is hydrogen or methyl and their pharmacologically accetpable acid addition salts.

2. A compound according to claim 1 wherein R₄ is hydrogen or lower alkyl, R₅ is hydrogen, and R₇ is hydrogen.

3. A compound according to claim 1 wherein both thienyl groups are unsubstituted.

4. A compound according to claim 2 wherein at least one thienyl group has a lower alkyl substituent.

5. A compound according to claim 1 having the formula

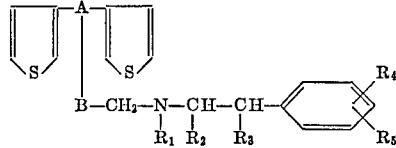

6. A compound according to claim 5 wherein both thienyl groups are unsubstituted.
7. A compound according to claim 1 wherein R₁ is H, R₂ is methyl, and R₄ and R₅ are hydrogen.
8. A compound according to claim 7 which is 1-[1,1-dithienyl-(3)-1-hydroxypropyl-(3)]-[1-phenyl-1-hydroxypropyl-(2)]-amine.
9. A compound according to claim 7 which is d,l-[1,1-dithienyl-(3)-1-hydroxypropyl-(3)]-[1-phenyl-1-hydroxypropyl-(2)]-amine.
10. A compound according to claim 7 which is 1-[1,1-dithienyl - (3) - propen-(1)-yl-(3)]-[1-phenyl-1-hydroxypropyl-(2)]-amine.
11. A compound according to claim 7 which is d,l-[1,1-dithienyl-(3)-propen - (1)-yl - (3)]-[1-phenyl-[1-hydroxy-hydroxypropyl-(2)]-amine.
12. A compound according to claim 7 which is 1-[1,1-dithienyl - (3) - 2-methylpropen-(1)-yl-(3)]-[1-phenyl-1-hydroypropyl-(2)]-amine.
13. A compound according to claim 1 wherein A—B— is >C(OH)—CH₂—.
14. A compound according to claim 13 wherein both thienyl rings are unsubstituted.
15. A compound according to claim 14 wherein R₁ is hydrogen and R₂ is methyl.
16. A compound according to claim 1 wherein A—B— is >C=CH—.
17. A compound according to claim 16 wherein both thienyl rings are unsubstituted.
18. A compound according to claim 17 wherein R₁ is hydrogen and R₂ is methyl.

References Cited
UNITED STATES PATENTS
3,251,858   5/1966   Thiele et al. _____ 260—332.3
3,330,825   7/1967   Thiele et al. _____ 260—240 R OTHER REFERENCES
Ehrhart: Arch. Pharm., vol. 295, pp. 196–205 (1962).

JOHN D. RANDOLPH, Primary Examiner

U.S. Cl. X.R.
260—329 AM; 332.3 R, 332.5, 543 R; 424—275